United States Patent
Twork et al.

(10) Patent No.: US 9,713,890 B2
(45) Date of Patent: Jul. 25, 2017

(54) METHODS OF MAKING INTERIOR PANELS HAVING INTEGRATED AIRBAG DEPLOYMENT DOORS FOR MOTOR VEHICLES

(71) Applicants: Michael J. Twork, White Lake, MI (US); Kenneth Raymond Jones, Clifford, MI (US)

(72) Inventors: Michael J. Twork, White Lake, MI (US); Kenneth Raymond Jones, Clifford, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 0 days.

(21) Appl. No.: 14/552,742

(22) Filed: Nov. 25, 2014

(65) Prior Publication Data
US 2016/0144562 A1 May 26, 2016

(51) Int. Cl.
| | | |
|---|---|---|
| *B29C 67/00* | (2017.01) | |
| *B29C 45/17* | (2006.01) | |
| *B29K 101/12* | (2006.01) | |
| *B29L 31/30* | (2006.01) | |

(52) U.S. Cl.
CPC .. *B29C 45/1704* (2013.01); *B29C 2045/1729* (2013.01); *B29K 2101/12* (2013.01); *B29L 2031/3038* (2013.01); *B29L 2031/3041* (2013.01)

(58) Field of Classification Search
CPC ............ B29C 45/1703; B29C 45/1704; B29C 67/0048; B29L 2031/3041
See application file for complete search history.

(56) References Cited

U.S. PATENT DOCUMENTS

| | | | | |
|---|---|---|---|---|
| 4,093,693 A | * | 6/1978 | Lemelson | B21C 23/24 264/173.16 |
| 5,028,377 A | | 7/1991 | Hendry | |
| 5,225,741 A | | 7/1993 | Auld, Jr. et al. | |
| 5,744,776 A | | 4/1998 | Bauer | |
| 5,900,198 A | * | 5/1999 | Hori | B29C 44/105 264/50 |
| 6,666,999 B1 | * | 12/2003 | Orsen | B29C 45/1704 264/572 |
| 8,424,587 B1 | * | 4/2013 | Dubay | B29C 45/34 164/305 |
| 2003/0209841 A1 | * | 11/2003 | Porter | B29C 45/0046 264/513 |
| 2008/0136067 A1 | * | 6/2008 | Scott | B29C 45/43 264/500 |

OTHER PUBLICATIONS

Wikipedia , Weld line.*

* cited by examiner

*Primary Examiner* — Alison L Hindenlang
*Assistant Examiner* — Mohamed K Ahmed Ali
(74) *Attorney, Agent, or Firm* — Lorenz & Kopf LLP

(57) ABSTRACT

Methods of making interior panels having integrated airbag deployment doors for motor vehicles are provided. In one example, a method of making an interior panel comprises contacting a molten resin in a molding tool cavity with a plurality of juxtaposed pressurized gas streams to form a series of holes, bubbles, knit lines, or combinations thereof in the molten resin. The molten resin is solidified to form a substrate. The series of holes, bubbles, knit lines, or combinations thereof define a frangible tear seam in the substrate.

12 Claims, 3 Drawing Sheets

METHODS OF MAKING INTERIOR PANELS HAVING INTEGRATED AIRBAG DEPLOYMENT DOORS FOR MOTOR VEHICLES

TECHNICAL FIELD

The present disclosure relates generally to interior panels for motor vehicles, and more particularly to methods of making interior panels that include a substrate with a frangible tear seam that defines an integrated airbag deployment door for a motor vehicle.

BACKGROUND

Motor vehicles often include an inflatable restraint apparatus having a deployable airbag positioned in or behind an interior vehicle panel, such as an instrument panel, door panel, and the like. Many interior panels include an integrated deployment door formed into the interior panel that is designed to break free upon deployment of the airbag. Controlling the opening of the deployment door is desirable for providing a clean deployment, e.g., minimal or no fragmentation, of the airbag through the interior panel. Often an area of the interior panel surrounding the deployment door is scored or pre-weakened, e.g., via laser scoring, mechanical scoring, or the like, to form a seam that facilitates a clean airbag deployment.

In one example disclosed in U.S. Pat. No. 5,744,776, issued to Bauer, a pre-weakening internal groove is formed in an automotive trim piece after the automotive trim piece has been molded or otherwise formed. In particular, an automotive trim piece is formed, for example, by injection molding a polymeric material to form an automotive trim piece cover layer. The automotive trim piece cover layer is then mounted on a fixture and a laser beam impinges the inside surface of the cover layer to form a groove that defines a pre-weakening pattern which functions as an integrated airbag deployment door. A robot arm may be used to move a laser generator so as to form the pre-weakening pattern. Unfortunately, such secondary operations that include, for example, laser generators, robots, and/or fixtures for forming a pre-weakening pattern in an automotive trim piece after molding or otherwise after forming of the automotive trim piece are relatively expensive and can include significant investment and/or operating costs.

Accordingly, it is desirable to provide methods of making interior panels having integrated airbag deployment doors for motor vehicles with improved manufacturing efficiencies and/or lower manufacturing costs. Furthermore, other desirable features and characteristics of the present disclosure will become apparent from the subsequent detailed description and the appended claims, taken in conjunction with the accompanying drawings and this background.

BRIEF SUMMARY

Methods of making interior panels having integrated airbag deployment doors for motor vehicles are provided herein. In an exemplary embodiment, a method of making an interior panel having an integrated airbag deployment door for a motor vehicle comprises contacting a molten resin in a molding tool cavity with a plurality of juxtaposed pressurized gas streams to form a series of holes, bubbles, knit lines, or combinations thereof in the molten resin. The molten resin is solidified to form a substrate. The series of holes, bubbles, knit lines, or combinations thereof define a frangible tear seam in the substrate.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the disclosure or the application and uses of the disclosure. Furthermore, there is no intention to be bound by any theory presented in the preceding background or the following detailed description.

Various embodiments contemplated herein relate to methods of making interior panels having integrated airbag deployment doors for motor vehicles. The exemplary embodiments taught herein provide a molding tool for shaping a polymeric resin into a substrate via a molding process, such as, for example, an injection molding process. In an exemplary embodiment, the molding tool has a first molding tool portion and a second molding tool portion that is matched to the first molding tool portion to define a molding tool cavity when the first and second molding tool portions are positioned in a "closed mold" configuration. During the molding process, the polymeric resin is heated to form a molten resin that is advanced in the molding tool cavity.

In an exemplary embodiment, a plurality of juxtaposed pressurized gas streams (e.g., pressurized air streams) is advanced through the first molding tool portion into the molding tool cavity for contact with the molten resin. Because the molten resin is in a fluidized state, the juxtaposed pressurized gas streams can displace, disturb, or otherwise interrupt the molten resin to form a series of holes, bubbles, and/or knit lines in the molten resin. In an exemplary embodiment, the series of holes, bubbles, and/or knit lines form a "door flap-shaped" pattern (e.g., a "U-shaped" pattern or alternatively an "H-shaped" pattern). The molten resin is then solidified in the molding tool to form the substrate in which the series of holes, bubbles, and/or knit lines define a frangible (e.g., fragile or breakable) tear seam. In an exemplary embodiment, the substrate may be used "as is" or may be further decorated for use as an interior panel for a motor vehicle in which the frangible tear seam defines an integrated airbag deployment door. In an exemplary embodiment, the integrated airbag deployment door is configured to rupture, for example, during an airbag deployment to form an opening in the substrate to allow an airbag to deploy through the substrate. Advantageously, by using the juxtaposed pressurized gas streams to form a frangible tear seam during the molding fabrication stage of the substrate, subsequent secondary operations for forming a pre-weakening pattern in the substrate are not needed thereby improving manufacturing efficiencies and/or reducing manufacturing costs.

Figure 1:
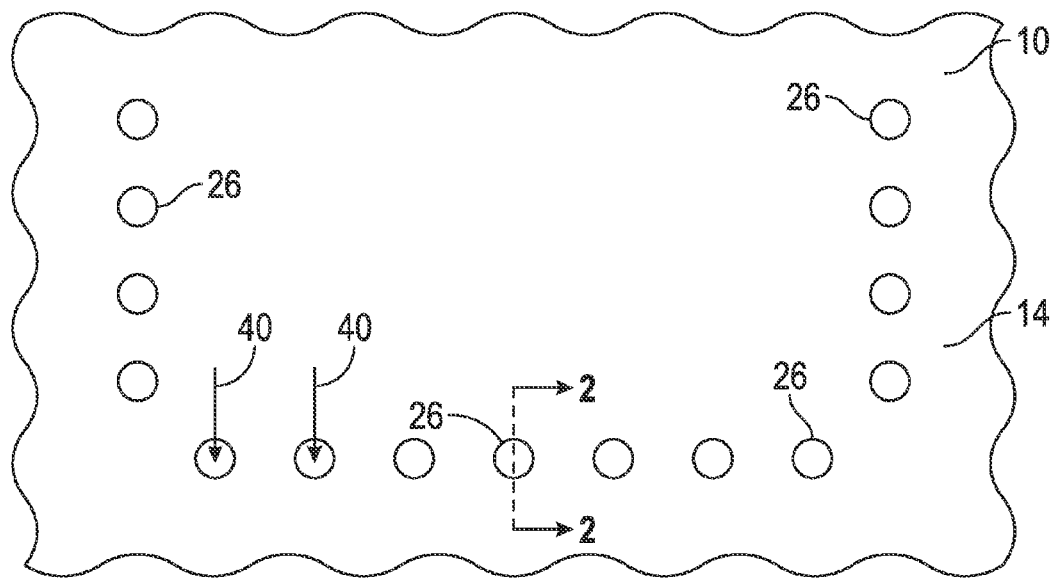
FIG. 1 is a plan view of a molding tool for fabricating a substrate for an interior panel for a motor vehicle in accordance with an exemplary embodiment.
Figure 2:
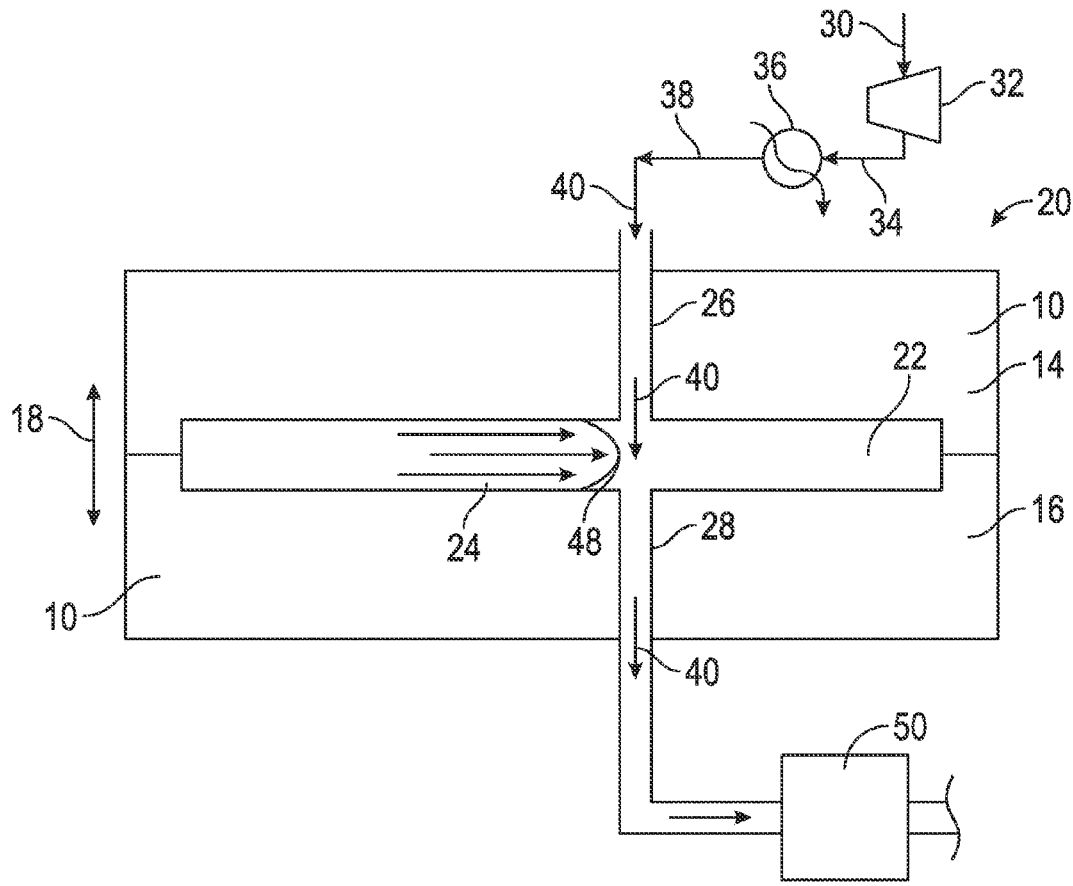
FIG. 2 is a sectional view of the molding tool depicted in FIG. 1 along line 2-2.

FIG. 1 is a plan view of a molding tool 10 for fabricating a substrate 12 (shown in FIG. 6) for an interior panel for a motor vehicle in accordance with an exemplary embodiment. FIG. 2 is a sectional view of the molding tool 10 depicted in FIG. 1 along line 2-2. The molding tool 10 includes molding tool portions 14 and 16 that may be moved relative to each other along an axis (indicated by double headed arrow 18) during a molding process, such as, for example, an injection molding process as is well-known in the art. The axis 18 may be, for example, a horizontal axis or a vertical axis.

As illustrated in FIG. 2, the molding tool portions 14 and 16 are positioned in a "closed mold" configuration 20 in which the molding tool 10 is fully closed such as during an injection cycle in a conventional injection molding process, or alternatively, substantially closed such as during an injection cycle in a low pressure injection molding just prior to "pack-out" as is well-known in the art. In an exemplary embodiment, the molding tool portions 14 and 16 are a match die set and define a molding tool cavity 22 when the molding tool portions 14 and 16 are positioned in the closed mold configuration 20.

During the injection cycle, a molten resin 24 is advanced through one or more gates (not shown) into the molding tool cavity 22. In an exemplary embodiment, the molten resin 24 is a polymeric material in a molten state and comprises polypropylene (PP), thermoplastic olefin (TPO), polycarbonate (PC), ABS, styrene maleic anhydride (SMA), polyamide (PA), polyurethane (PU or TPU), polyester (PE), or combinations thereof. In one embodiment, the polymeric material is a PP/TPO material, which is particularly well-suited for many vehicle interior plastic panel applications. As used herein, the term "PP/TPO material" refers to a material that contains polypropylene (PP) and/or thermoplastic olefin (TPO). Additionally, the polymeric material may be unfilled, filled, or compounded to provide desired properties for a particular application. Other polymeric materials for molding polymeric substrates known to those skilled in the art may also be used. In an exemplary embodiment, the molten resin 24 has a temperature of from about 150 to about 310° C.

As illustrated, the molding tool portion 14 has a plurality of channels 26 formed therethrough that are aligned with corresponding channels 28 that are formed through the molding tool portion 16. A gas 30 such as air, nitrogen, oxygen or the like is compressed via a compressor 32 to form a pressurized gas stream 34. In an exemplary embodiment, the pressurized gas stream 34 is passed through a chiller 36 to chill the pressurized gas stream 34 and to form a pressurized gas stream 38. In an exemplary embodiment, the pressurized gas stream 38 has a temperature of from about −30 to about 20° C., for example from about −30 to about 5° C., and a pressure of from about 13,800 to about 34,500 kPa gauge.

Figure 4:
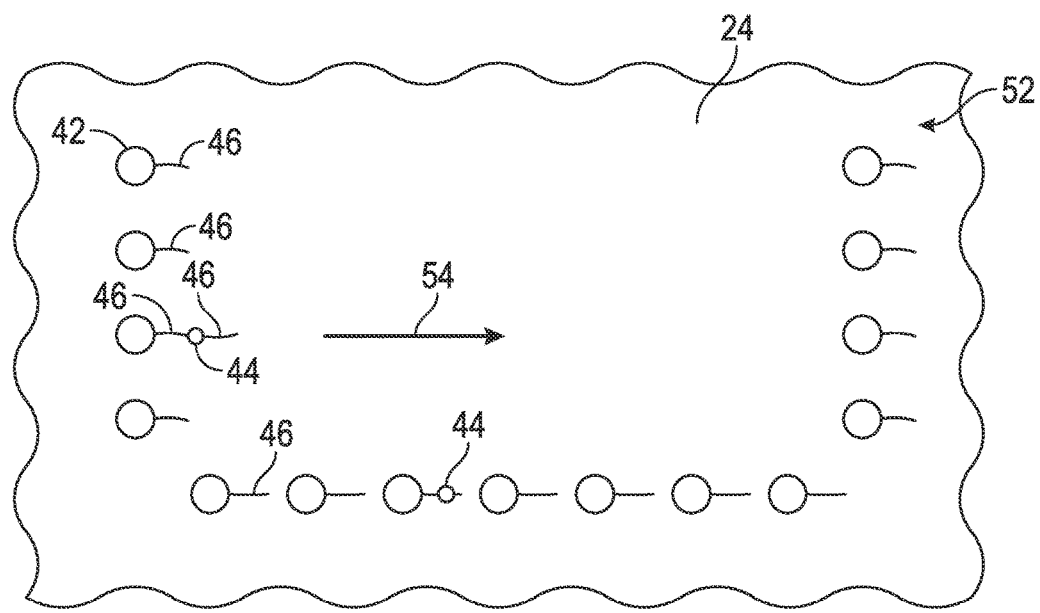
FIG. 4 is a plan view of a molten resin during an intermediate fabrication stage of a substrate for an interior panel for a motor vehicle in accordance with an exemplary embodiment.

The pressurized gas stream 38 is introduced to the molding tool 10 and portions of the pressurized gas stream 38 are correspondingly passed through the channels 26 as a plurality of juxtaposed pressurized gas streams 40. Referring also to FIG. 4, the juxtaposed pressurized gas streams 40 advance through the molding tool portion 14 into the molding tool cavity 22 and contact the molten resin 24 to form a series of holes 42, bubbles 44, and/or knit lines 46 in the molten resin 24 In an exemplary embodiment, advantageously the juxtaposed pressurized gas streams 40 have a pressure that is greater than the pressure of the molten resin 24 to forcibly displace, disturb, or otherwise interrupt the molten resin 24 and form the series of holes 42, bubbles 44, and/or knit lines 46. In an exemplary embodiment, the juxtaposed pressurized gas stream 40 has a pressure that is from about 3,450 to about 20,700 KPa greater than the pressure of the molten resin 24 to facilitate forming the series of holes 42, bubbles 44 and/or knit lines 46.

Figure 3:
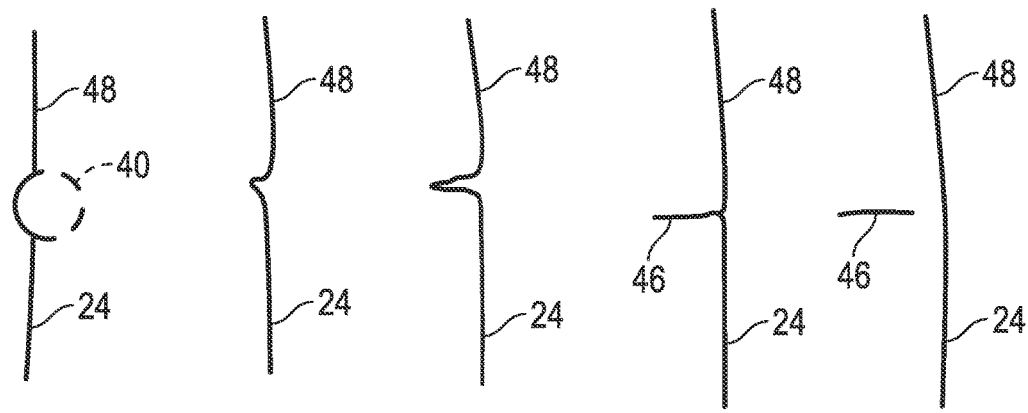
FIG. 3 is a plan view of a melt flow front of a molten resin during an early fabrication stage of a substrate for an interior panel for a motor vehicle in accordance with an exemplary embodiment.

FIG. 3 illustrates from left to right of the figure, in plan views, a melt flow front 48 (e.g., forward-most edge of the flowing molten resin 24) of the molten resin 24 at progressively advanced stages during an injection cycle as a melt flow front 48 moves past being disturbed or interrupted by a corresponding juxtaposed pressurized gas stream 40 to form the knit line 46. The melt flow front 48 initially contacts the juxtaposed pressurized gas stream 40 (shown at the left most portion of FIG. 3) which locally disrupts the flow of the melt flow front 48. As the melt flow front 48 continues advancing, portions of the melt flow front 48 that were disrupted by the juxtaposed pressurized gas stream 40 merge back together to form the knit line 46 (shown at the right portion of FIG. 3). In an exemplary embodiment, the juxtaposed pressurized gas stream(s) 40 has a temperature of from about −30 to about 20° C., for example from about −30 to about 5° C., to advantageously locally cool and solidify the disrupted melt flow front 48 to facilitate forming the knit line 46 (and/or the holes 42 and/or bubbles 44 shown in FIGS. 4-5 depending upon the pressure as discussed in further detail below). In an exemplary embodiment, the juxtaposed pressurized gas stream 40 may be discontinued or turned off (e.g., via sequential valve gating or valve timing as is well known in the art) after initial contact with the melt flow front 48 to facilitate forming the knit line 46 without forming, for example, any holes 42 and/or bubbles 44. Advantageously, forming knit lines 46 without forming any holes 42 and/or bubbles 44 in the molten resin 24 facilitates forming an outer surface on the substrate 12 (shown in FIG. 6) that is continuous and may be more aesthetically desirable. Alternatively, forming holes 42 and/or bubbles 44 in the molten resin 24 facilitates forming a weaker frangible tear seam 58 in the substrate 12 (shown in FIG.), which may be more desirable for airbag deployment. In an exemplary embodiment, when the pressure difference between the juxtaposed pressurized gas stream 40 and the molten resin 24 is relatively small (e.g., from about 3,450 to about 6,900 KPa), less disruption occurs to the molten resin 24 (e.g., the melt flow front 48) so as to bias formation of knit lines 46 over formation of holes 42 and/or bubbles 44. Alternatively, in an exemplary embodiment, when the pressure difference between the juxtaposed pressurized gas stream 40 and the molten resin is relatively large (e.g., from about 6,900 to about 20,700 KPa), more disruption occurs to the molten resin 24 (e.g., the melt flow front 48) to increase formation of the holes 42 and/or bubbles 44 in addition to forming the knit lines 46.

Referring back to FIG. 2, in an exemplary embodiment, a vacuum 50 is applied to the channels 28 to facilitate advancing the juxtaposed pressurized gas streams 40 from the molding tool cavity 22 into the channels 28. Advantageously, applying the vacuum 50 to the channels 28 helps prevent the molding tool cavity 22 from accumulating residual gas from the juxtaposed pressurized gas streams 40 for an improved molding process. In an exemplary embodiment, the channels 26 and 28 have a diameter of from about 0.1 to about 1 mm, such as from about 0.1 to about 0.8 mm, for example from about 0.2 to about 0.5 mm to advantageously prevent the molten resin 24 from entering into the channels 26 and 28 for an improved molding process.

Figure 5:
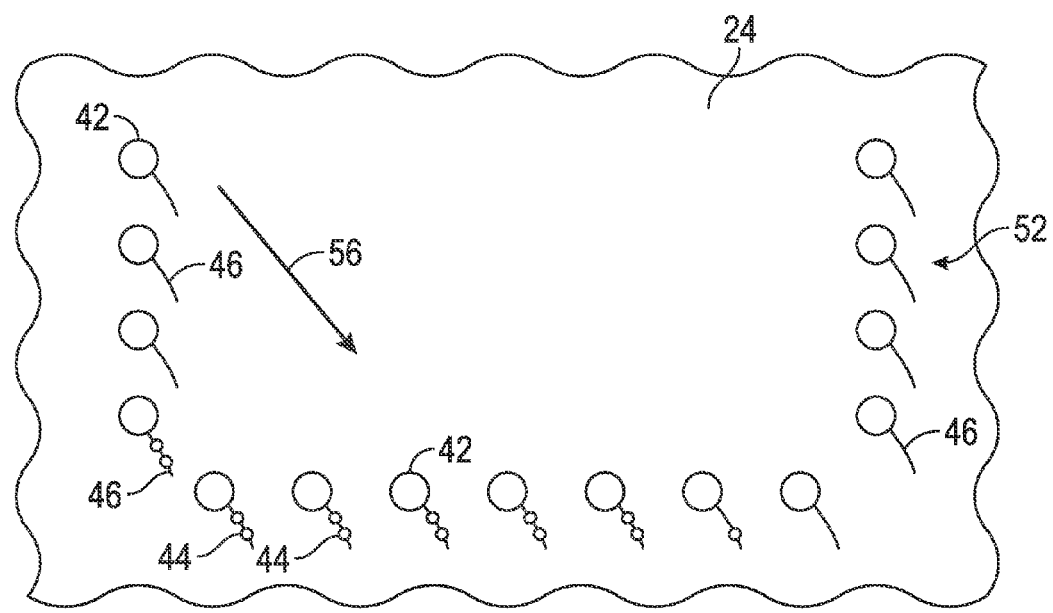
FIG. 5 is a plan view of a molten resin during an intermediate fabrication stage of a substrate for an interior panel for a motor vehicle in accordance with an exemplary embodiment.

Referring to FIGS. 1 and 4-5, in an exemplary embodiment, the juxtaposed pressurized gas streams 40 are configured as a patterned group and are spaced apart from each other such that the series of holes 42, bubbles 44, and/or knit lines 46 form a "door flap-shaped" pattern 52 in the molten resin 24 (e.g., a "U-shaped" pattern or alternatively an "H-shaped" pattern (not shown)). In an exemplary embodiment, the adjacent pressurized gas streams 40 are spaced apart from each other a distance of from about 1 to about 5 mm to form the series of holes 42, bubbles 44, and/or knit lines 46. Advantageously, such spacing facilitates forming the frangible tear seam 58 (shown in FIG. 6) that is enhanced for a clean airbag deployment. Additionally and as illustrated in FIGS. 4 and 5, depending upon the flow direction 54 or 56 of the molten resin 24 during the injection cycle, the position of the bubbles 44 and/or knit lines 46 can be tailored to facilitate forming the frangible tear seam 58 (shown in FIG. 6) that is also enhanced for a clean airbag deployment.

Figure 6:
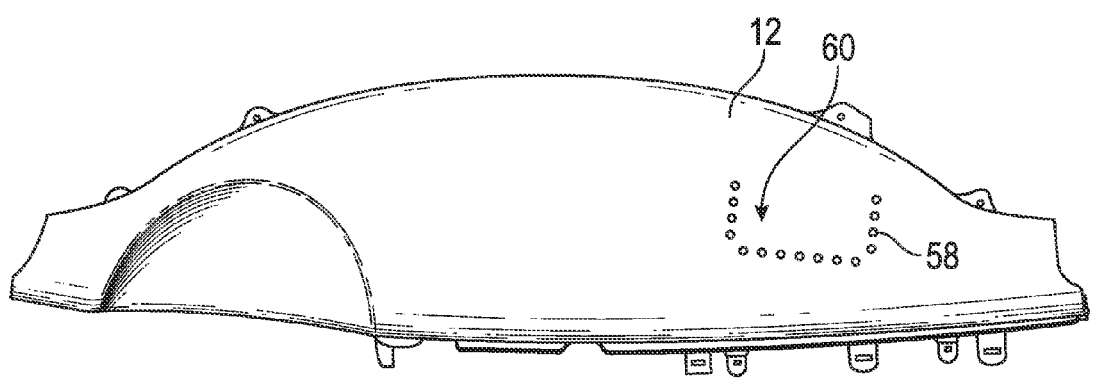
FIG. 6 is a perspective view of a substrate for an interior panel for a motor vehicle in accordance with an exemplary embodiment.

Referring to FIG. 6, the molten resin 24 is solidifying to form the substrate 12 in which the series of holes 42, bubbles 44, and/or knit lines 46 (shown in FIGS. 4-5) define the frangible tear seam 58 in the substrate 12. In an exemplary embodiment, the molten resin 24 is cooled in the molding tool 10 (shown in FIG. 2), for example to a temperature of about 50° C. or less (e.g. from about 15 to about 50° C.), to solidify the molten resin 24 as is well known in the art. The frangible tear seam 58 defines an integrated airbag deployment door 60 that is configured to rupture, for example, during an airbag deployment to form an opening in the substrate 12 to allow an airbag to deploy through the substrate 12. In an exemplary embodiment, the substrate 12 forms at least in part an interior panel such as an instrument panel that can be positioned forward of a driver seat and a front passenger seat of a motor vehicle. Alternatively, the substrate 12 may form at least in part an interior panel such as a door panel or any other interior vehicle trim panel. Additionally, the substrate 12 may be further decorated with a coating, cover skin, cover skin and foam, and/or the like.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A method of making an interior panel having an integrated airbag deployment door for a motor vehicle, the method comprising the steps of:
advancing a forward most edge of a melt flow front of molten resin in a first direction within a molding tool cavity; contacting the forward most edge of the melt flow front in the molding tool cavity with a plurality of juxtaposed pressurized gas streams passing through the molding tool cavity in a second direction which is transverse to the first direction to form a series of holes, bubbles, knit lines, or combinations thereof in the molten resin; and solidifying the molten resin to form a substrate, wherein the series of holes, bubbles, knit lines, or combinations thereof define a frangible tear seam in the substrate.

2. The method of claim 1, wherein contacting comprises contacting the molten resin with the juxtaposed pressurized gas streams that have a temperature of from −30 to about 20° C.

3. The method of claim 1, wherein contacting comprises contacting the molten resin with the juxtaposed pressurized gas streams that have a pressure of from about 13,800 to about 34,500 kPa gauge.

4. The method of claim 1, wherein contacting comprises contacting the molten resin with the juxtaposed pressurized gas streams such that adjacent pressurized gas streams are spaced apart from each other a distance of from about 1 to about 5 mm to form the series of holes, bubbles, knit lines, or combinations thereof.

5. The method of claim 1, wherein the molding tool cavity is at least partially surrounded by a first molding tool portion and a second molding tool portion that is matched to the first molding tool portion thereby defining a molding tool cavity shape that corresponds to a shape of the substrate, wherein the first molding tool portion has a plurality of first channels formed therethrough, and wherein the method further comprises advancing the juxtaposed pressurized gas streams correspondingly through the first channels into the molding tool cavity for contact with the molten resin.

6. The method of claim 5, wherein advancing comprises advancing the pressurized gas streams correspondingly through the first channels each having a diameter of from about 0.1 to about 1 mm.

7. The method of claim 5, wherein the second molding tool portion has a plurality of second channels formed therethrough that are correspondingly aligned with the first channels, and wherein the method further comprises advancing the juxtaposed pressurized gas streams from the molding tool cavity into the second channels.

8. The method of claim 7, further comprising applying a vacuum to the second channels to facilitate advancing the juxtaposed pressurized gas streams from the molding tool cavity into the second channels.

9. The method of claim 1, wherein contacting comprises contacting the molten resin that has a first pressure with the juxtaposed pressurized gas streams that have a second pressure that is greater than the first pressure.

10. The method of claim 9, wherein contacting comprises contacting the molten resin with the juxtaposed pressurized gas streams in which a pressure difference between the first pressure and the second pressure is from about 3,450 to about 20,700 KPa.

11. The method of claim 1, further comprising compressing a gas for forming the juxtaposed pressurized gas streams.

12. The method of claim 1, further comprising chilling a gas for forming the juxtaposed pressurized gas streams.

* * * * *